J. E. Newcomb.

Mower.

No. 3484 Reissued Jun. 1, 1869.

Witnesses
James Gaughan
Jno J Wagoner

Inventor
J. F. Seiberling

J. E. Newcomb.

Mower.

No 3484 Reissued Jun. 1, 1869.

Witnesses
James Langhun
Jno J Wagoner

Inventor
J H Sibberling

UNITED STATES PATENT OFFICE.

J. F. SEIBERLING, OF AKRON, OHIO, (ASSIGNEE OF FANNY HOLMES, EXECUTRIX OF THE ESTATE OF JOHN E. NEWCOMB, DECEASED.)

IMPROVEMENT IN HARVESTERS.

Specification forming part of Letters Patent No. 12,215, dated January 9, 1855; extended seven years; Reissue No. 3,484, dated June 1, 1869.

*To all whom it may concern:*

Be it known that the late JOHN E. NEWCOMB, of Whitehall, in the county of Washington and State of New York, did invent certain new and useful Improvements in Mowing and Reaping Machines, of which the following is a full, clear, and exact description, reference being had to the accompanying drawings, forming part of this specification, in which—

Figure 1:
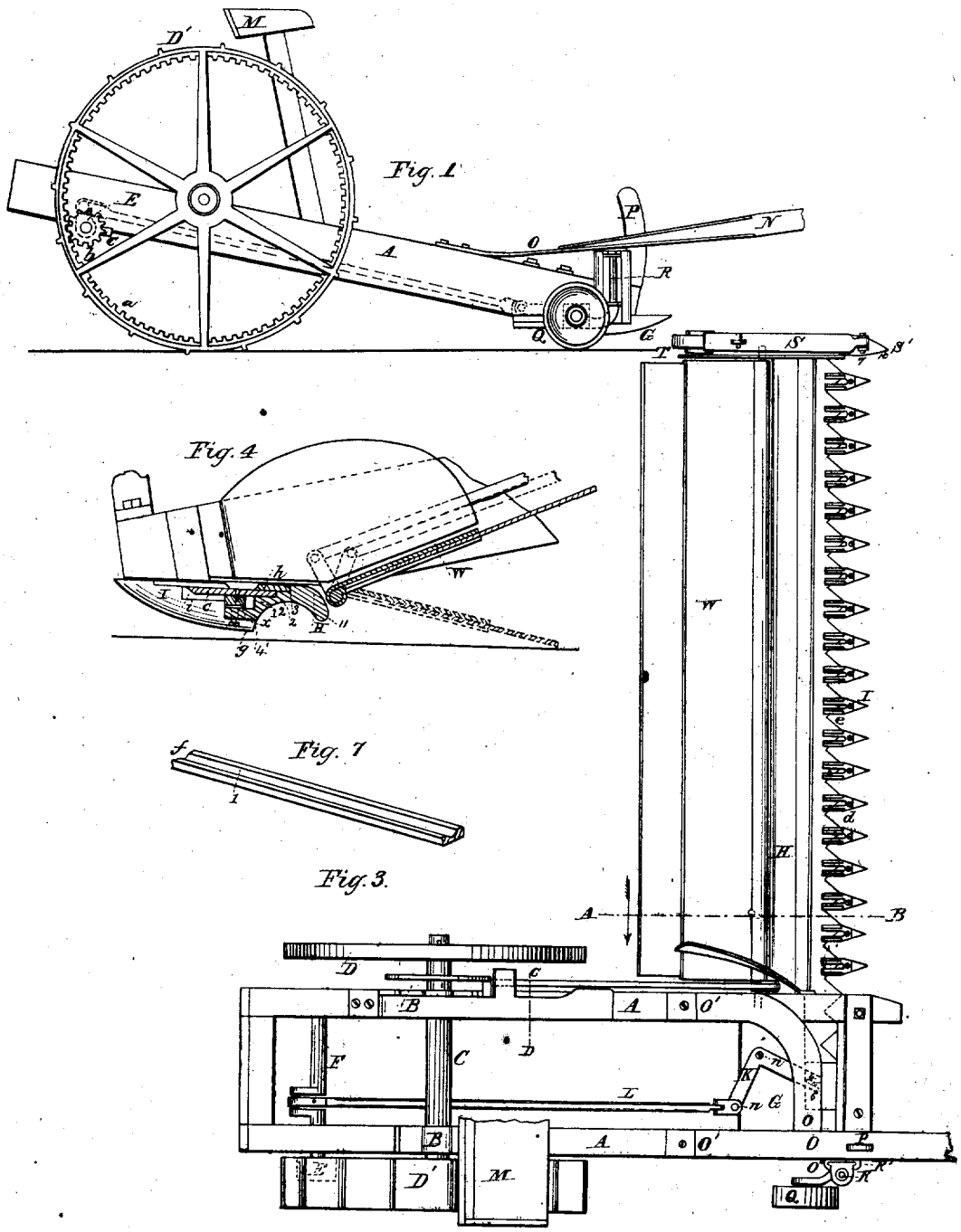
Figure 2:
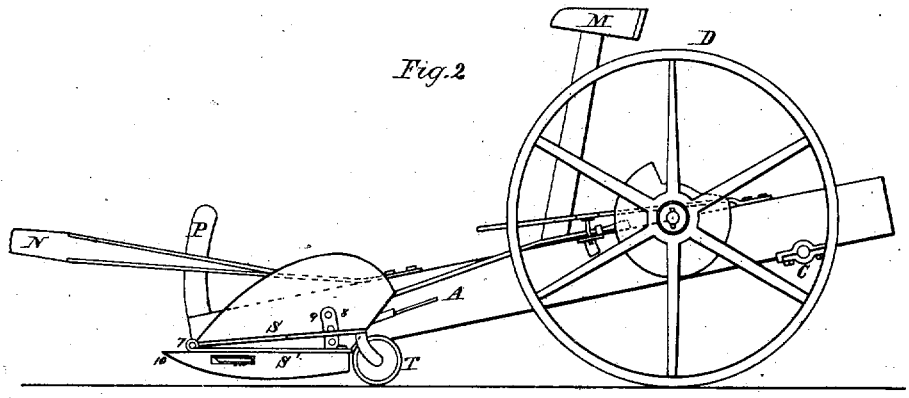
Figure 6:
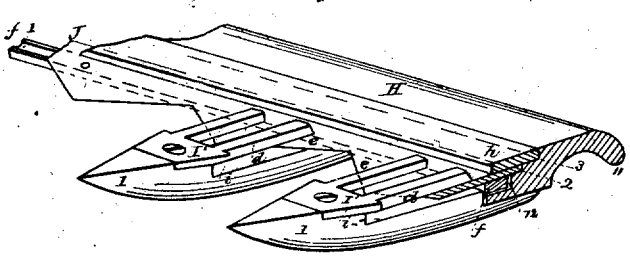
Figure 5:
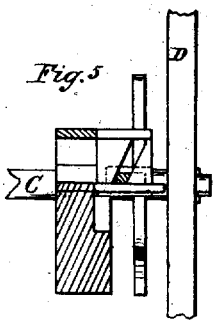
Figure 8:
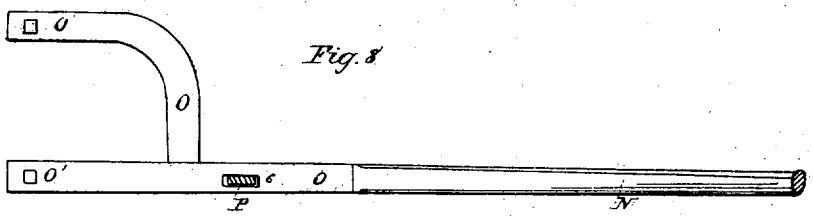

Figure 1 represents an outside view of the machine, with the tongue broken off. Fig. 2 represents an inside view of the machine, with the tongue broken off. Fig. 3 represents a plan or top view of the machine, with the tongue broken off and a portion of the driver's seat. Fig. 4 represents a section of a part of the machine on line A B, Fig. 3. Fig. 5 represents a section on line C D, Fig. 3. Figs. 6 and 7 represent perspective views of detached parts of the cutting apparatus, and Fig. 8 represents a top or plan view of the rear portion of the tongue and the spring by which it is secured to the main frame.

To enable those skilled in the art to which the said NEWCOMB'S improvements relate to make and use that part of the said NEWCOMB'S invention or improvements which forms the subject-matter of this division of reissue, I will proceed to describe the same more in detail.

The nature of these last-named improvements consists, first, in a new mode of attaching the tongue to the carriage or main frame of a reaper and mower; second, in a new mode of combining the draft attachment with the main frame of a reaper and mower; third, the combination, in a harvesting-machine, of the following elements, viz: two main supporting-wheels, a main frame arranged between the supporting-wheels and vibrating around the main axle, a vibrating tongue, a seat for the driver, and a laterally-projecting finger-beam for supporting the fingers and cutter-bar, having a draft-support at one end only, and that from the front end of the vibrating frame, as hereinafter described; fourth, the combination and relative arrangement, with the finger-beam of a front-cut two-wheeled combined reaping and mowing machine, of two small adjustable wheels, arranged relatively to the finger-beam, cutter-bar, and main frame, as hereinafter described; fifth, the combination, with the main frame, of a caster-wheel and adjustable caster-wheel frame, as hereinafter described; sixth, the combination, with the outer shoe, of a standard and supporting-wheel, and an arm hinged to the forward end of the shoe, as hereinafter described; seventh, the combination, with the outer shoe, of an arm hinged to the forward end of the shoe, and extending back for supporting a wheel in rear of the shoe, as hereinafter described; eighth, in a metallic finger-beam having a ledge and shoulder on its front upper corner for receiving and guiding the back of the scythe, as hereinafter explained; ninth, in a metallic finger-beam for reaping and mowing machines having a flange or down-projection upon its rear under side, for the purposes hereinafter set forth; tenth, the combination, with the scythe-plate, of a grooved adjustable pressure-plate, as hereinafter described.

In the drawings, A is the main frame, suspended by boxes or bearings B B from the main axle C, which in turn is supported in an elevated position by the wheels D D′. The latter, being a driving-wheel, has cogs or teeth *a*, which mesh into the teeth *b* on the spur-gear E on the outer end of the crank-shaft F, which turns in bearings *c c* on the frame A, said bearings being so arranged as to support said crank-shaft parallel with the main axle C, but below a horizontal plane passing through the axis thereof, for the purposes hereinafter to be explained.

The front of frame A extends forward and inclines downward, as indicated in the drawings, the front of said frame being free to tilt or rise and fall to conform to the inequalities of the ground over which it may be drawn.

To the under side of the front of main frame A is fastened the metallic shoe G, which supports the heel or inner end of the finger-beam H, which is made curved or corrugated, as indicated in Figs. 4 and 6. By making the finger-beam in the form shown, greater strength and lightness for a given amount of metal are obtained than would be the case if the beam was made with flat sides.

To the front under side of the finger-beam

H are fastened the guard-fingers I, provided with slotted caps I′, having their edges *d*, against which the cutters *e* work. The cutter-bar or back of the cutter-plate J is supported on a grooved bar, *f*, which is kept up against the plate by set-screws *g*, which pass through the front part H′ of the finger-beam, and are so combined with the finger-beam and grooved bar that when turned in one direction bar *f* will be elevated, and vice versa.

Oil can be supplied to the groove 1 in the bar *f* through holes in the cutter-plate. (See dotted lines, Fig. 4.) The back of the cutter-plate J works against a shoulder, 2, formed in the front upper edge of the finger-beam, while it is retained in place by a top plate or guard-piece, *h*, secured in a recess, 3, on the finger-beam, so as to be flush with the top of latter, whereby the cut stalks of grain or grass are not liable to catch and hang or lodge on the top of the bar.

By arranging the cutters relatively to the fingers, as shown and described, an open space, *i*, is left below each cutter, and thus all clogging of the same in consequence of grass working under the cutter is obviated, while at the same time excessive friction is avoided by the use of the grooved bar *f* for supporting the cutter-plate, as shown and described.

The cutter J is operated, or has a reciprocating motion imparted to it, from the driving-wheel by means of the bell-crank K, connecting or crank rod L, crank-shaft F, and gear E.

The bell-crank K works on an upright stud, *m*, fast in the shoe G. One arm of said crank has a slot, 4, to receive the stud 5 on the heel end of the cutter-bar, while the other arm of the crank is hinged or jointed to one end of the short piece *n*, which, in turn, is hinged or jointed to the front end of the crank or connecting rod L.

It will be seen by reference to Fig. 3 that, by means of the short double-jointed piece *n* interposed between the front end of the crank or connecting rod and the bell-crank, all binding of the crank-rod is prevented, since the joints of piece *n* are arranged at right angles to each other, thus admitting of a free up-and-down motion to the rear end of connecting-rod L, and a reciprocating circular motion to the rear arm of the bell-crank.

The slot 4 in the forward arm of the bell-crank prevents binding between the crank and cutter-bar, although the motion of the cutter plate or bar is in a straight line, while that of the arm of the bell-crank, to which it is attached, is in the arc of a circle.

By arranging the crank-shaft F parallel with, but below, a horizontal line passing through the axis of the main axle, the crank-rod can be operated below said axis, and consequently is so much depressed that it does not interfere with the driver's feet as he sits on seat M, which may be supported from frame A, as indicated in the drawings. Then, again, by the use of the parallel crank-shaft F, power can be communicated directly to the rod which operates the cutter-bar without the employment of bevel-gearing, which is always necessary in that class of machines in which the crank-shaft is arranged at right angles, or nearly so, to the shaft upon which is the gear or wheel from which it receives its motion, thus avoiding much friction. Still, again, by the use of a crank-shaft parallel with the axis of the main driving wheel or gear, in combination with a bell-crank, a very narrow frame can be employed, while the crank connecting-rod and bell-crank can all be arranged nearly in a line and back of the cutter-bar, as indicated in the drawings, and their free action is not cramped or deranged by the rising and falling of the finger-beam to conform to the inequalities of the ground.

In lieu of attaching the tongue N of the carriage or reaper and mower in the usual manner by a hinged or swivel joint, it is attached by a strong spring-piece, O O, of iron or other material, the spring being bolted to the frame A at the ends O′ O′, as indicated in the drawings.

As the tongue is secured to the frame at a point back of the cutting apparatus or front of the frame, to prevent the former from twisting about or laterally, a slot, 6, is formed in the rear part of the tongue, through which the upright guide-piece P passes; and as the guide-piece P is fastened to the front of the frame, which supports the finger-beam, it will be seen that the tongue and front of the main frame are retained in their proper relative positions laterally as the finger-beam rises and falls to admit of the cutting apparatus conforming to the inequalities of the surface of the ground over which it is drawn, or when the tongue is elevated or depressed.

When the tongue is attached to the front of the frame by a hinge-joint on a line, or nearly so, with the cutter-bar, the rear end of the tongue is elevated and depressed to the same extent as the finger-beam as the latter conforms to the inequalities of the ground over which it is drawn, thus creating an uneasy and chafing action of the harness or harnesses of the team. Then, again, when the draft is from the front of a tilting frame, any sudden strain is liable to lift the cutting apparatus prematurely from the surface of the ground, especially if the front of the frame does not greatly overbalance the rear part thereof; and if the latter is the case, then the increased weight and friction of the cutting apparatus upon the ground increase the draft of the machine to an objectionable extent.

The foregoing objections, as well as those incident to that class of tilting-frame machines in which the tongue is hinged to the main axle are, to a great extent, obviated by attaching the tongue to the main frame by a yielding connection back of the finger-beam and forward of the main axle.

In that class of machines designed for both reaping and mowing, provision must be made to operate the cutter-bar in an easy manner when the front of the frame or that part to which the finger-beam is attached is depressed, as indicated in Figs. 1 and 2.

By arranging the parallel crank-shaft F below or nearer the ground than the main axle, power is communicated from the crank-shaft by means of the crank or connecting rod L and bell-crank to the cutter-bar with but little loss of power, as compared to what it would be if the crank-shaft were arranged on a plane above the main axle, as will be readily understood by reference to Fig. 1, in which the relative positions of the crank-shaft, connecting-rod, and bell-crank are indicated by dotted lines.

As the finger-beam must be sustained in an elevated position when the machine is used for reaping, a ready and convenient mode of adjusting the same to any desired height is provided, in this instance, by combining a caster-wheel, Q, with the front of the main frame. The caster-wheel is supported upon a journal in the lower curved end of the spindle R, which is fitted to turn in proper bearings in the frame Q′, which, in turn, is fitted so that it can be moved up or down in the guide-piece R′, to support the inner or heel end of the finger-beam at the required distance above the ground to adapt the machine for reaping or mowing. The frame Q′, after being adjusted, may be held in place by a set-screw or screws.

The outer end of the finger-beam is sustained by means of an adjustable grain-wheel, T, the journal of which is supported in the rear end of an arm or frame, S, the front end of which is hinged or connected by a yielding joint, 7, to the outer shoe S′, or a cap-piece thereon, in front of the finger-beam and cutter-bar, as fully indicated in the drawings.

Frame S has a slot, through which the standard 8 passes. The latter is fastened to the rear part of the shoe S′, and is provided with a series of holes, 9, to receive a pin for the purpose of adjusting the outer end of the finger-beam at the proper height for mowing or reaping, as the case may be.

It will be observed that the arrangement of wheel T is such that it occupies a position in rear of shoe S′, thereby obviating the necessity of a wide outer shoe provided with a shield or cover for the grain-wheel.

The devices for adjusting and supporting the outer end of the finger-beam are therefore simple, and yet compact, and not liable to be clogged up by the cut grain or grass, nor are they liable to break down or tangle up the stalks of uncut grain or grass beyond the dividing-point 10 of shoe S′.

The caster-wheel Q facilitates the turning of the machine and is quite important.

It will be noticed that the rear of the metal finger beam or bar H is made with a downwardly-projecting part, 11. This down or under projection adds strength to the finger-beam without adding materially to the width of the upper part of the beam, over which the stalks of cut grass or grain pass after being severed by the sickle or cutter. This is important, since it contributes to render the cutting apparatus more effective by preventing clogging from an undue accumulation of stalks upon the beam. Then, again, by supporting the back of the cutter bar or plate upon a ledge, 12, formed in the front upper face or edge of the finger-beam, in combination with a shoulder, 2, in the finger-beam, to sustain the cutters against back strain, the cutters are retained and held in a position which insures a very accurate motion of the same through the slotted fingers I, since the back of the scythe has a bottom and rear support which is not only even and true, but one which is not liable to be thrown out of line, the bar being very stiff, especially when made with a down-projection, 11.

The team may be attached to the tongue for drawing the machine in any well-known manner.

By arranging the crank-shaft back of the main axle and below a horizontal plane passing through the same, the inclination at which the crank-rod works is very slight, as compared to what it would be if it worked above the main axle. This is an important feature in a practical point of view, since the nearer the crank-rod works on the same horizontal plane with the bell-crank, the less power it requires to operate the cutter.

When the machine is used as a reaper, an apron or grain-platform, W, is used, upon which the stalks of cut grain fall, and are supported until discharged therefrom in gavels upon the ground by a drop or back inclining or falling motion of said platform, as fully set forth in the specification of a separate division of this reissue and of even date herewith; consequently no further detailed description of the working and operation of said platform or apron, and the devices more particularly connected therewith, will be given in this specification.

Having described that part of the said invention or improvement which forms the subject-matter of this division of reissue, what is claimed as the invention of the said JOHN E. NEWCOMB, and desired to have secured in this division of reissue by Letters Patent, is—

1. The combination, with the tongue and carriage or main frame of a reaper and mower, of an intermediate spring-connection, substantially as and for the purposes set forth.

2. The combination, with tongue N and frame A, of the peculiarly-constructed spring-metal piece O O′, substantially as described.

3. The combination, in a harvesting-machine, of the following elements, viz., two main supporting-wheels, a main frame arranged between the two supporting-wheels and vibrating around the main axle, a vibrating tongue, a seat for the driver, and a laterally-projecting finger-beam, connected at one end only to the forward end of the vibrating frame.

4. The combination, with the finger-beam, of a front-cut two-wheeled combined reaping and mowing machine, connected at one end only to a vibrating frame, which admits of its rising and falling to conform to the inequalities of the ground, of two small adjustable wheels, the outer wheel being connected with the outer shoe, so as to run on the ground back of the finger-beam, and the inner wheel arranged in advance of the back of the finger-beam and connected to the machine at a point forward of the line of cut, whereby the finger-beam, whether adjusted for reaping or mowing, is supported and prevented from dropping into water-furrows or dragging on the ground, substantially as described.

5. The combination, with the frame A, of the caster-wheel Q and adjustable frame Q′, substantially as described.

6. The combination, with shoe S′ and standard 8 on said shoe, of the supporting-wheel T and its arm S, hinged to the forward end of the shoe, substantially as and for the purposes as set forth.

7. The combination, with the outer shoe, of an arm hinged to the forward end of said shoe, and extending back to support a wheel which runs upon the ground in rear of the shoe when the machine is in operation, substantially as described.

8. A metallic finger-beam for mowing and reaping machines, having a ledge, 12, and shoulder 2 formed on its front upper corner, for receiving and guiding the back of the scythe, substantially as set forth.

9. A metallic finger-beam for reaping and mowing machines, having a flange or down-projection upon its rear under side, for the purposes stated.

10. The combination of the grooved pressure plate or bar *f* and adjusting-screws *g* with the scythe-plate, substantially as and for the purposes set forth.

J. F. SEIBERLING.

Witnesses:
W. L. CLARKE,
J. H. BELLOWS.